United States Patent
Bueltmann

(10) Patent No.: US 7,632,013 B1
(45) Date of Patent: Dec. 15, 2009

(54) PADDED COVER FOR AN X-RAY FILM CASSETTE

(76) Inventor: Helen Bueltmann, 4224 Deaton Dr., Olivehurst, CA (US) 95961

( * ) Notice: Subject to any disclaimer, the term of this patent is extended or adjusted under 35 U.S.C. 154(b) by 0 days.

(21) Appl. No.: 12/117,559

(22) Filed: May 8, 2008

(51) Int. Cl.
*H05G 1/00* (2006.01)
(52) U.S. Cl. ...................................... 378/204; 378/210
(58) Field of Classification Search ................. 378/162, 378/167, 177, 182, 185, 187, 204, 210
See application file for complete search history.

(56) References Cited

U.S. PATENT DOCUMENTS 5,684,853 A * 11/1997 Fick et al. .................... 378/167
6,209,156 B1    4/2001 Hershey \* cited by examiner

*Primary Examiner*—Courtney Thomas
(74) *Attorney, Agent, or Firm*—Lewis and Roca LLP

(57) ABSTRACT

A padded X-ray film cassette cover is disclosed for use during an X-ray procedure. The padded cassette cover has a base member and a padded pocket member forming a cassette cavity there between. An X-ray film cassette is inserted within the cassette cavity prior to positioning the film cassette with respect to a patient. The padded cassette cover has a top handle and a side handle formed therewith to facilitate positioning of the cover and cassette assembly. The padded cassette cover is preferably fabricated from materials that facilitate cleaning and sanitization to prevent the transfer of germs, bacteria and infectious materials.

11 Claims, 3 Drawing Sheets

PADDED COVER FOR AN X-RAY FILM CASSETTE

FIELD OF THE INVENTION

The present invention relates to medical devices such as those used in performing X-rays. More specifically, the present invention relates to a padded cover for use during the X-ray procedure, the cover enhancing patient comfort.

BACKGROUND OF THE INVENTION

An X-ray is a common medical procedure that is performed upon a patient in order to image an internal portion of a patient's body. The X-ray procedure is used to facilitate diagnosis of an injury or other medical ailment. During the X-ray procedure, an X-ray film cassette or carrier is placed under a portion of the patient's body. Proper positioning of the patient is very important to produce the desired image. Frequently the patient or body extremity has to be held in a specific orientation in order to adequately image the desired portion of the body. These orientations can be difficult to maintain and may in some cases be painful for the patient because the patient's body is in contact with the hard exterior of the X-ray film cassette.

It is common for the patient requiring an X-ray procedure to be injured or in poor health and thus the procedure becomes an unpleasant experience. For example, the patient may have a broken bone such as an arm or leg and positioning the injured extremity on a traditional X-ray film cassette is frequently painful for the patient. In another example, the patient may be elderly and/or underweight such that sensitive portions of the patient's body are susceptible to contacting the X-ray film carrier. For example, an elderly patient may require a chest X-ray. The chest X-ray requires that the film cassette be placed behind the back of the patient. During this procedure the patient has to lean back on the film cassette. In the case where the patient has protruding vertebrae, these vertebrae contact the hard exterior of the X-ray film cassette, which in turn causes the patient pain and discomfort.

A common approach to solve this problem and provide comfort for the patient is to place a sheet or pillowcase between the patient and the film cassette. While this approach is somewhat helpful, it frequently does not provide enough protection from the hard exterior surface of the film carrier. Additionally, the use of a pillowcase or sheet increases the risk of spreading germs, bacteria and infectious materials due to the difficulty in sterilizing these materials.

Another traditional attempt to provide patient comfort during the X-ray procedure is to place an entire pillow between the patient and the film cassette. This solution is undesired because of the decrease in image quality that is caused by the thick pillow obstructing and interfering with the imaging procedure. Additionally the pillow is extremely difficult to sanitize and thus increases the risk of spreading germs, bacteria and other infectious materials. Finally, this solution suffers from the disadvantage and difficulty in simultaneously positioning both the pillow and the X-ray film cassette with respect to the patient. This disadvantage is amplified when the patient is in pain or otherwise uncomfortable.

Therefore, it is apparent that there is a need for enhancing patient comfort during the X-ray procedure. Consequently, known efforts to enhance patient comfort and provide efficient/cost effective protection from the X-ray film cassette have not met with much success to date.

SUMMARY OF THE INVENTION

The present invention overcomes the above-mentioned disadvantages, and meets the recognized need for such a device used to enhance patient comfort during an X-ray procedure by providing a padded cover for the X-ray film cassette, which is easily used and sanitized.

In accordance with one aspect of the present invention, a padded cassette cover for use with an X-ray film cassette is disclosed. The padded cassette cover comprising a base member, the base member having a first side, an opposing second side, a top edge, an opposing bottom edge, a first side edge, and an opposing second side edge. A pocket member coupled to the base member, the pocket member having an external surface, an internal surface, a top edge, an opposing bottom edge, a first side edge, and an opposing second side edge. The external surface and internal surface of the pocket member are configured in a spaced apart relationship to form a cushion cavity there between. A cushion member is disposed within the cushion cavity to provide an impact-absorbing region.

The pocket member is coupled with the base member by attaching the bottom edge, the first side edge and the second side edge of the pocket member adjacent to the bottom edge, the first side edge, and the second side edge of the base member. The interior surface of the pocket member substantially faces the first side of the base member and is configured in a spaced apart relationship to form a cassette cavity there between. The cassette cavity sized to receive the X-ray film cassette therein.

The invention further comprises one or more handles used to grasp the padded cassette cover. In one version, the top edge of the pocket member is offset from the top edge of the base member. At least one of the exterior or interior surface of the pocket member extends towards the top edge of the base member, forming a flange pair along the top edge of the base member and top edge of the pocket member. A pair of elongate apertures are formed through the flange pair, the elongate apertures located substantially at a midpoint of the top edge of the base member and the midpoint of the pocket member. The pair of elongate apertures form a handle for grasping the padded cassette cover.

In another variation the first side edge of the pocket member is offset from the first side edge of the base member, forming a flange along the first side edge of the base member. An elongate aperture is cut through the flange, the elongate aperture located substantially at a midpoint of the first side edge of the base member. The elongate aperture forms a handle for grasping the padded cassette cover.

In other exemplary embodiments the padded cassette cover comprises various modifications and additional features. Firstly, the padded cassette cover may include at least one indicator strip movably coupled with a padded cassette cover. The indicator strip corresponding to at least one boundary edge formed by the X-ray film cassette inserted in the cassette cavity. This provides a user with visual indication of the boundary edges for the X-ray film cassette. Secondly, the pocket member may be attached to the base member using vulcanization methods. Finally, the cushion member may be configured and fabricated from several materials and configurations such as foam and more specifically a visco-elastic foam. The cushion member may be configured as either an air or liquid filled chamber.

For a more complete understanding of the nature and various advantages of the present invention, reference should be made to the ensuing detailed description and claims, taken in conjunction with the accompanying drawings.

BRIEF DESCRIPTION OF THE DRAWINGS

The components in the figures are not necessarily to scale, emphasis instead being placed upon illustrating the principles of the invention. In the figures, like reference numerals designate like elements and corresponding parts throughout the different views, and in which.

DETAILED DESCRIPTION OF THE INVENTION

In describing the exemplary embodiments of the present invention, specific terminology is employed for the sake of clarity. The invention, however, is not intended to be limited to this terminology and it should be understood that each specific element disclosed herein further includes all technical equivalents that operate in a similar manner to accomplish similar functions.

In general, the present invention enhances patient comfort and facilitates the X-ray procedure by providing a padded cover for use with an X-ray film cassette. In the following description, numerous specific details are set forth in order to provide a more thorough description of the present invention. It will be apparent, however, to one skilled in the art, that the present invention may be practiced without these specific details. Other embodiments of the invention will readily suggest themselves to such skilled persons having the benefit of this disclosure. In some instances, well-known features have not been described in detail so as not to obscure the invention.

Figure 1:
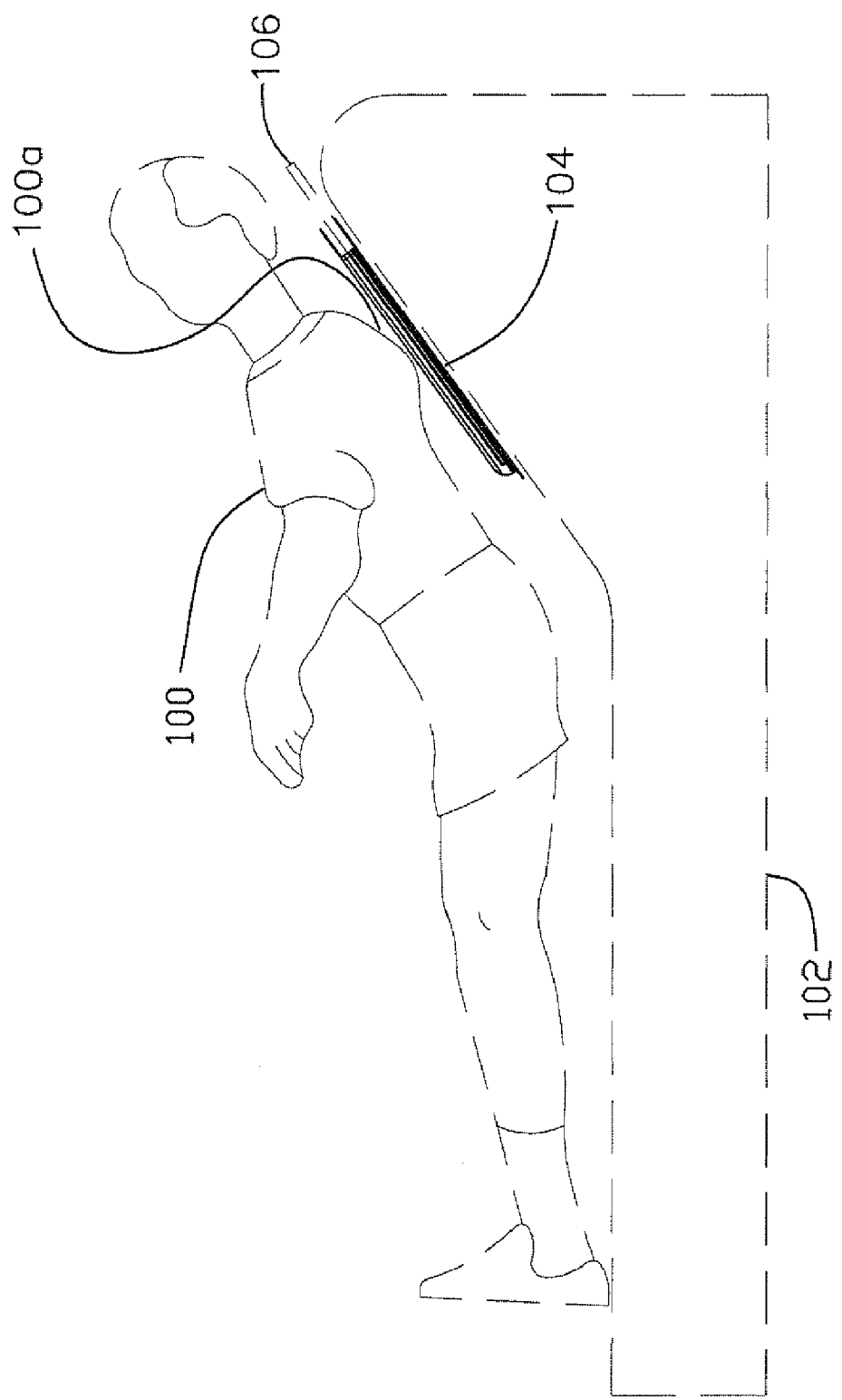
FIG. 1 is a side view of a patient positioned on a gurney during an X-ray procedure and using the padded cassette cover in accordance with the present invention.

Directing attention to FIG. 1, which illustrates a patient 100 in the process of undergoing a common X-ray procedure. The patient 100 is positioned upon a gurney 102 or other supporting member such as a hospital bed or stretcher. A padded X-ray film cassette cover 104 has an X-ray film cassette 106 inserted therein. The padded cassette cover 104 is positioned between the patient 100 and the gurney 102 such that the X-ray film cassette 106 is located to adequately image the desired portion of the patient 100. In FIG. 1, the X-ray film cassette 106 and padded cassette cover 104 are positioned adjacent to the back 100a of the patent 100. For example, this positioning of the X-ray film cassette 106 may be used when acquiring a chest X-ray of the patient. The X-ray film cassette 106, however, may be placed adjacent to other portions or extremities of the patient 100 as required by the medical condition of the patient 100. Since the X-ray film cassette 106 is substantially enveloped by the padded cassette cover 104, the patient 100 interfaces with the X-ray film cassette 106 through interaction and tactile engagement with the padded cassette cover 104. Through this engagement, the patient 100 experiences enhanced comfort and avoids direct contact with the hard exterior of the X-ray film cassette 106.

Figure 2:
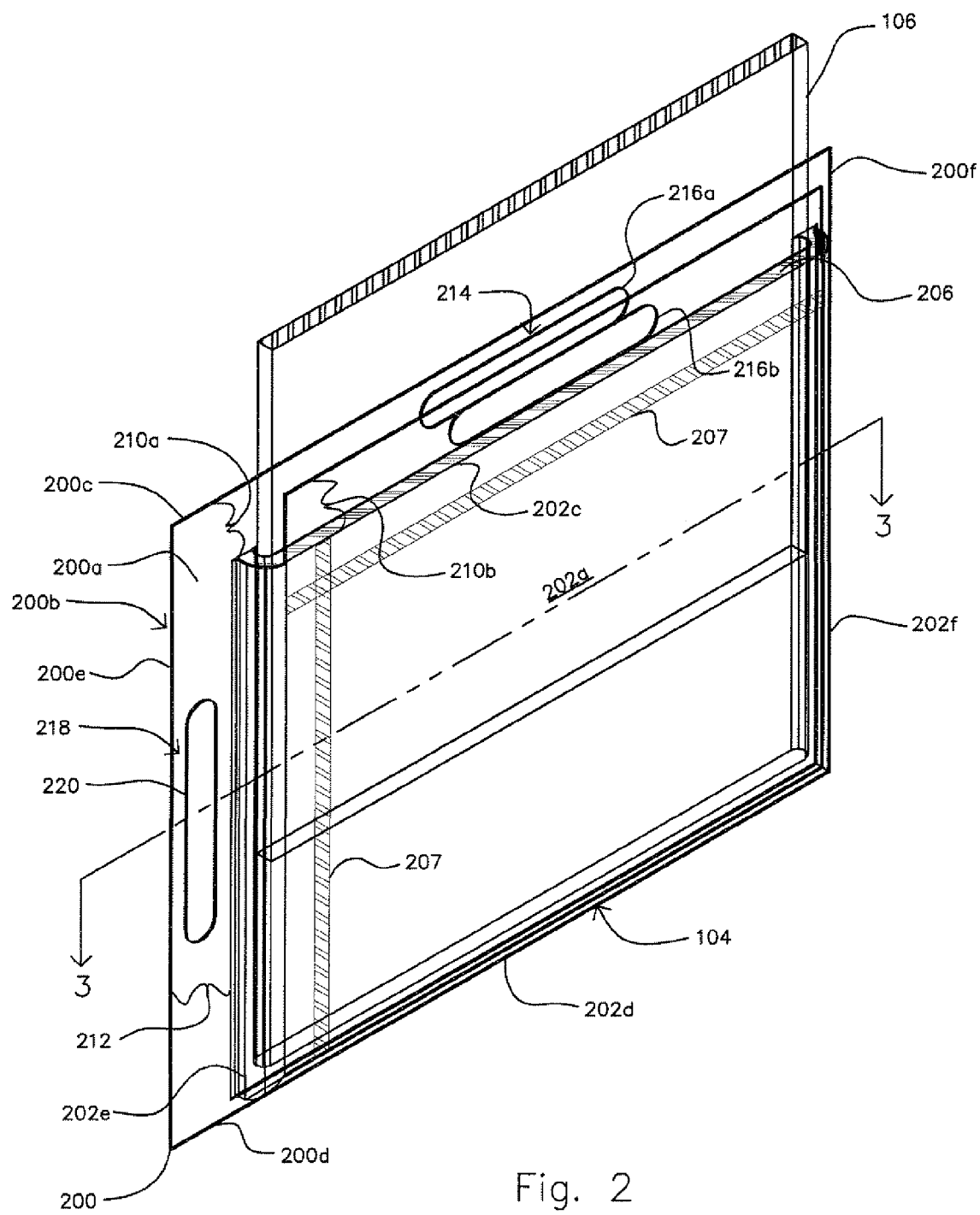
FIG. 2 is an isometric view of an X-ray film cassette partially inserted into the padded cassette cover in accordance with the present invention.

In FIG. 2 an isometric view of one exemplary embodiment for the padded X-ray film cassette cover 104 is shown. The padded cassette cover 104 is generally rectangular in shape and is sized to adequately receive an X-ray film cassette 106 therein. Although the exemplary embodiment comprises a padded cassette cover 104 in rectangular shape, it is contemplated in one or more alternate embodiments that the padded cassette cover could be configured in other desired shapes.

The padded cassette cover 104 comprises a base member 200 coupled with a padded pocket member 202. The base member 200 has a first side 200a, an opposing second side 200b, a top edge 200c, an opposing bottom edge 200d, a first side edge 200e, and an opposing second side edge 200f. The padded pocket member 202 has an external surface 202a, an internal surface 202b, a top edge 202c, an opposing bottom edge 202d, a first side edge 202e and an opposing second side edge 202f. The external surface 202a and internal surface 202b, of the padded pocket member 202, are configured in a spaced apart relationship such that a cushion cavity 204 is formed there between. Within cushion cavity 204 is disposed an impact absorbing cushion member 206.

In one exemplary embodiment, the padded pocket member 202 is coupled with the base member 200 such that internal surface 202b substantially faces the first side 200a of the base member 200. The internal surface 202b of the pocket member 202 and first side 200a of the base member 200 are configured in a spaced apart relationship such that a cassette cavity 208 is formed there between. The cassette cavity 208 is sized and configured to substantially envelope and receive an X-ray film cassette 106 therein. Furthermore, the bottom edge 202d is proximate with bottom edge 200d of the base member 200 and second side edge 202f is proximate with second side edge 200f of the base member 200. In this exemplary embodiment, top edge 202c is offset from top edge 200c of the base member 200 to form a first flange pair 210a/210b and first side edge 202e is offset from the first side edge 200e of the base member to form a second flange 212.

It is contemplated, that first flange 210b may or may not comprise the cavity 204 and cushion member 206. In the embodiment where first flange 210b does not include cavity 204 and cushion member 206, first flange 210b is formed integrally by extending either the exterior surface 202a or the interior surface 202b towards the top edge 200c of the base member 200.

The exemplary embodiment illustrated in FIG. 2, further includes a top handle 214 generally located about the midpoint of the top edge 200c of the base member. The handle 214 is configured by providing a pair of elongate apertures 216a/216b formed through the first flange pair 210a/210b respectively. The elongate apertures 216a/216b may be formed by cutting, die-punching or other known manufacturing processes. Apertures 216a/216b are substantially aligned such that a user of the padded cassette cover 104 may insert their hand through both the apertures 216a/216b and thereby securely grasp the cover 104. The user may then move and/or manipulate the padded cassette cover 104 and inserted X-ray film cassette 106 as desired with respect to the patient 100.

Also illustrated in FIG. 2, is a side handle 218 generally located about the midpoint of the first side edge 200e of the base member. The side handle 218 is produced by providing an elongate aperture 220 formed though the second flange 212. Side handle 218 is sized and configured to permit a user to insert their hand there through such that the user may move and/or manipulate the padded cassette cover 104 and inserted X-ray film cassette as desired with respect to the patient 100.

It is contemplated in one exemplary embodiment, that the padded pocket member 202 and base member 200 are affixed substantially along the length of edges 200d/202d, 200e/202e and 200f/202f. The coupling of the pocket member 202 and base member 200 is preferably by way of vulcanizing the edges of the pocket member 202 with the corresponding edges of base member 200. Although vulcanization is preferably used to join the base member and pocket member, it is contemplated in other alternate embodiments that stitching, gluing, riveting and/or other well-known fabric fastening means could be utilized instead thereof and/or in combination therewith.

In this embodiment, the members 200/202 are fabricated from a radiolucent polymer such as vinyl. By radiolucent, it is meant that the vinyl is permeable by radiation or other X-rays used in medical imaging. The vinyl is commercially available and commonly used in known X-ray table pads. One example of this material is common vinyl found at upholstery shops. The vinyl would need to not be cloth backed because of bacteria and germ retention. The vinyl would need to be checked for radiolucency because of differences in manufacturing and thickness. Other preferred characteristics of the material used to fabricate the base and pocket members 200/202 are that the material be waterproof, washable and sanitizable such that the spread of germs, bacteria and other infectious material can be minimized.

In another exemplary embodiment, the exterior surface 202a of the padded pocket 202 further includes a means for marking the boundaries of the X-ray film cassette 106 inserted therein. The means for marking may include one or more indicator strips 207 that are movably, releasably or slidably coupled with the padded cassette cover 104. In one variation, the indicator strips are coupled with the exterior surface 202a of the pocket member 202. The indicator strip 207 may be releasably coupled using hook and loop fasteners, buttons, snaps or other well-known fabric fastening means. Alternatively, the indicator strip 207 may be slidably coupled using track and grove configuration, loop and rail configuration or other well-known slidable coupling means. The indicator strips 207 are positionable with respect to the length and width of the padded cassette cover 104. The means for marking increases functionality of the padded cassette cover by providing a way to visually indicate where the boundaries of the X-ray film cassette are located in relation to the padded cassette cover. By visually indicating where the boundaries are located it is easier to position the padded cassette cover 104 and X-ray film cassette 106 assembly with respect to the body of the patient.

Figure 3:
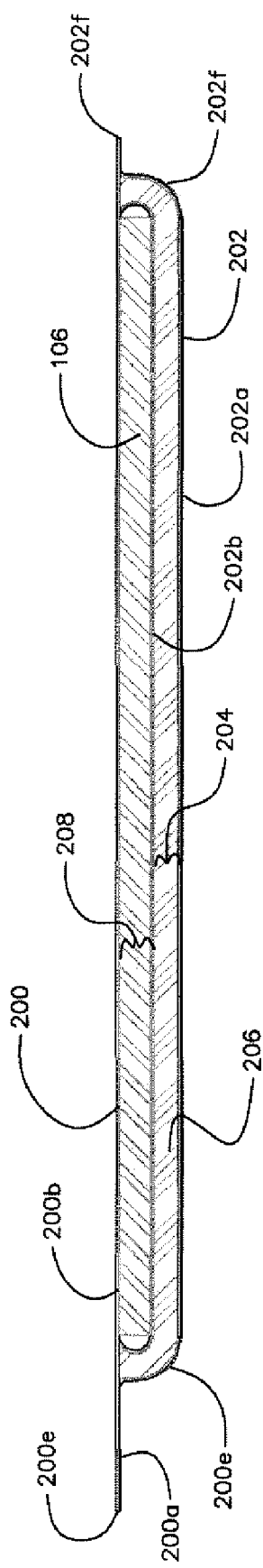
FIG. 3 is a cross-sectional view of the padded cassette cover in accordance with the present invention, the cross-section taken along line 3-3 of FIG. 2.

Reference is now directed to FIG. 3, which illustrates a cross-sectional view of the padded cassette cover 104. As shown in FIG. 3, cassette cavity 208 is formed by a spaced apart relationship between the interior surface 202b of the pocket member 202 and the first side 200a of the base member 200. The cassette cavity 208 is sized to receive an X-ray film cassette 106 therein. Similarly, cavity 204 is formed by a spaced apart relationship between the exterior surface 202a and the interior surface 202b of the pocket member 202. Received within cavity 204 is a cushion member 206.

In one exemplary embodiment, cushion member 206 is approximately 1 inch thick and is fabricated from synthetic closed-cell foam. In other embodiments, however, other types of cushions can be used such as high-density foam, visco-elastic (memory) foam, hypoallergenic foam and combinations thereof. Visco-elastic or memory foam is made from polyurethane with additional chemicals that add to its viscosity level, thereby increasing its density. Visco-elastic foam, depending on the chemicals used and its overall density, is firmer in cool temperatures and softer when warm. Higher density visco-elastic foam generally reacts to body heat, which allows it to quickly mold itself to the shape of a warm body. The visco-elastic foam preferably provides increased comfort by conforming to the body of the patient and thereby cushioning the interaction between the patient and the padded cassette cover.

It is further contemplated that cushion member 206 may be fabricated from other known cushions that provide impact absorption, one of ordinary skill in the art will readily appreciate these alternate cushioning means. Some examples of alternate materials and configurations for the cushion member 206 are: synthetic batting, fiber-fill, air-filled pocket, pneumatic chambers, liquid filled bladders and combinations thereof.

In one embodiment, the padded cassette cover 104 is sized to receive a common X-ray film cassette 106. In this embodiment, the padded cassette cover 104 is approximately 22 inches wide by 18 inches tall and adequately receives an X-ray film cassette that is 17 inches wide by 14 inches tall. Although, this embodiment is described with these specific dimensions, one of ordinary skill in the art will readily appreciate that other sizes and configurations may be implemented to practice the present invention.

In use, the padded cassette cover of the present invention provides an improved interface between the patient and the X-ray film cassette. The padded cassette cover is utilized by an X-ray technician first inserting an X-ray film cassette into the cavity of the padded cassette cover. In an embodiment having a marking means, the technician then positions the marking means to correspond to the boundaries of the X-ray film cassette as inserted into the padded cassette cover. This marking means provides an externally visible reference line that indicates where the cassette is located within the padded cover. Next, the technician positions the padded cover and cassette assembly with respect to the patient. The medical imaging device or X-ray machine is activated thereby exposing the film contained within the cassette and creating the desired medical image on the film. The padded cover and cassette assembly is then retrieved. The X-ray film cassette is removed from the padded cassette cover and the cassette is sent for further image processing and film developing.

The present invention provides several advantages not currently found in known X-ray film cassettes or medical imaging procedures and devices. Firstly, the padded X-ray film cassette cover of the present invention provides a convenient means to enhance patient comfort during an X-ray procedure. Secondly, the padded cassette cover provides a patient interface that does not degrade image quality or otherwise adversely affect the medical imaging process. Thirdly, the padded cassette cover is fabricated from materials that facilitate cleaning and sanitization of the cover and thereby prevent the undesirable transfer of germs, bacteria, and infectious materials. Finally, the padded cassette cover is an efficient and cost-effect solution that provides increased patient comfort resulting in a pleasant X-ray imaging experience for the patient.

Although the above provides a full and complete disclosure of the preferred embodiments of the invention, various modifications, alternate constructions and equivalents will occur to those skilled in the art. For example, although the invention has been described with reference to an X-ray procedure requiring only one padded pocket member, other configurations of the padded cover can be utilized such as utilizing multiple pocket members. Moreover, different types and sizes of X-ray film cassettes can be used with the padded cassette cover to practice the invention. Additionally, the padded cassette cover may be configured as a disposable device that is intended for one-time use applications. Therefore, the above should not be construed as limiting the invention, which is defined by the claims.

What is claimed is:

1. A portable X-ray cassette pad for use with an X-ray film cassette, the portable X-ray cassette pad comprising:

a base member, the base member having a first side, an opposing second side, a top edge, an opposing bottom edge, a first side edge, and an opposing second side edge;

a pocket member coupled to the base member, the pocket member having an a flexible external surface, an internal surface, a top edge, an opposing bottom edge, a first side edge, and an opposing second side edge, the flexible external surface and internal surface configured in a spaced apart relationship to form a sealed cushion cavity there between; and at least one cushion member disposed within the sealed cushion cavity;

whereby the pocket member is coupled with the base member by attaching the bottom edge, the first side edge and the second side edge of the pocket member adjacent to the bottom edge, the first side edge, and the second side edge of the base member, the interior surface of the pocket member substantially facing the first side of the base member, the interior surface and first side configured in a spaced apart relationship to form a cassette cavity there between, the cassette cavity configured and sized to receive the X-ray film cassette therein.

2. The portable X-ray cassette pad in accordance with claim 1 wherein the top edge of the pocket member is offset from the top edge of the base member towards the bottom edge of the base member, at least one of the exterior or interior surface of the pocket member extends towards the top edge of the base member, forming a flange pair along the top edge of the base member and top edge of the pocket member.

3. The portable X-ray cassette pad in accordance with claim 2 further comprising a pair of elongate apertures formed through the flange pair, the elongate apertures located substantially at a midpoint of the top edge of the base member and the midpoint of the pocket member, wherein the pair of elongate apertures form a handle for grasping the padded cassette cover.

4. The portable X-ray cassette pad in accordance with claim 1 wherein the first side edge of the pocket member is offset from the first side edge of the base member towards opposing second side edge of the base member, forming a flange along the first side edge of the base member.

5. The portable X-ray cassette pad in accordance with claim 4 further comprising an elongate aperture formed through the flange, the elongate aperture located substantially at a midpoint of the first side edge of the base member, wherein the elongate aperture forms a handle for grasping the padded cassette cover.

6. The portable X-ray cassette pad in accordance with claim 1 further comprising at least one indicator strip movably coupled with padded cassette cover, wherein the at least one indicator strip corresponds to at least one boundary edge formed by the X-ray film cassette inserted in the cassette cavity.

7. The portable X-ray cassette pad in accordance with claim 1 wherein the pocket member is attached to the base member using vulcanization methods.

8. The portable X-ray cassette pad in accordance with claim 1, wherein the cushion member comprises a foam member.

9. The portable X-ray cassette pad in accordance with claim 8, wherein the foam member is fabricated from a visco-elastic foam.

10. The portable X-ray cassette pad in accordance with claim 1, wherein the cushion member comprises an air filled chamber.

11. The portable X-ray cassette pad in accordance with claim 1, wherein the cushion member comprises a liquid filled bladder.

* * * * *